(12) United States Patent
Yu

(10) Patent No.: US 12,334,046 B2
(45) Date of Patent: Jun. 17, 2025

(54) SOUND GENERATING ASSEMBLY AND ELECTRONIC DEVICE HAVING THE SAME

(71) Applicant: GOERTEK INC., Shandong (CN)

(72) Inventor: Changzhi Yu, Shandong (CN)

(73) Assignee: GOERTEK INC., Shandong (CN)

( * ) Notice: Subject to any disclaimer, the term of this patent is extended or adjusted under 35 U.S.C. 154(b) by 406 days.

(21) Appl. No.: 17/904,021

(22) PCT Filed: Dec. 16, 2020

(86) PCT No.: PCT/CN2020/136959
§ 371 (c)(1),
(2) Date: Aug. 11, 2022

(87) PCT Pub. No.: WO2022/116277
PCT Pub. Date: Jun. 9, 2022

(65) Prior Publication Data
US 2024/0029697 A1    Jan. 25, 2024

(30) Foreign Application Priority Data
Dec. 2, 2020   (CN) .......................... 202011389718.6

(51) Int. Cl.
*G10K 9/10*   (2006.01)

(52) U.S. Cl.
CPC ...................... *G10K 9/10* (2013.01)

(58) Field of Classification Search
CPC ........ H04R 2400/11; H04R 9/02; H04R 9/06; H01H 13/84; G08B 21/18; H02J 7/0042; H03K 17/97
See application file for complete search history.

(56) References Cited

U.S. PATENT DOCUMENTS 5,727,675 A * 3/1998 Leveque .............. H01H 13/023
                                                200/530
6,867,680 B1 * 3/2005 Kulle ..................... H03K 17/97
                                                338/12
(Continued)

FOREIGN PATENT DOCUMENTS

CN          203456911 U      2/2014
CN          105098509 A     11/2015
(Continued)

*Primary Examiner* — Forrest M Phillips
*Assistant Examiner* — Joseph James Peter Illicete
(74) *Attorney, Agent, or Firm* — LKGlobal | Lorenz & Kopf, LLP

(57) ABSTRACT

A sound generating assembly and an electronic device having the same are provided. The sound generating assembly comprises a bracket, two sides of the bracket are respectively connected with a housing and a cover having a through slot, and the cover is configured to move in a direction facing the housing or a direction away from the housing, a contact is provided between the bracket and the housing and is configured to move synchronously with the cover, an end of the contact that is away from the cover is provided with a sounding elastic piece, when the cover moves in a direction facing the housing and an upper surface of the bracket is exposed from the through slot, the sounding elastic piece is deformed and making a sound after being pressed by the contact.

19 Claims, 8 Drawing Sheets

(56) References Cited

U.S. PATENT DOCUMENTS

| | | | | |
|---|---|---|---|---|
| 6,982,630 | B2* | 1/2006 | Beckwith | G08G 1/005 |
| | | | | 340/407.1 |
| 10,431,402 | B2* | 10/2019 | Hsieh | H01H 13/10 |
| 10,930,451 | B2* | 2/2021 | Wang | H01H 13/85 |
| 2006/0139153 | A1 | 6/2006 | Adelman | |
| 2017/0070005 | A1 | 3/2017 | Joo et al. | |
| 2022/0102091 | A1* | 3/2022 | Caspers | H01H 13/14 |

FOREIGN PATENT DOCUMENTS

| | | | |
|---|---|---|---|
| CN | 105744772 | A | 7/2016 |
| CN | 105896126 | A | 8/2016 |
| CN | 107509146 | A | 12/2017 |
| CN | 206806627 | U | 12/2017 |
| CN | 206931779 | U | 1/2018 |
| CN | 107681312 | A | 2/2018 |
| CN | 207216592 | U | 4/2018 |
| CN | 108024183 | A | 5/2018 |
| CN | 208027952 | U | 10/2018 |
| CN | 109065394 | A | 12/2018 |
| CN | 208539627 | U | 2/2019 |
| CN | 110504127 | A | 11/2019 |
| CN | 209675177 | U | 11/2019 |
| CN | 110545510 | A | 12/2019 |
| CN | 110662134 | A | 1/2020 |
| CN | 209928968 | U | 1/2020 |
| CN | 210517856 | U | 5/2020 |
| CN | 210956516 | U | 7/2020 |
| CN | 111864837 | A | 10/2020 |

* cited by examiner

SOUND GENERATING ASSEMBLY AND ELECTRONIC DEVICE HAVING THE SAME

CROSS-REFERENCE TO RELATED APPLICATION

This application is a U.S. National Stage entry under 35 U.S.C. § 371 based on International Application No. PCT/CN2020/136959, filed on Dec. 16, 2020, which was published under PCT Article 21(2) and which claims priority from Chinese patent application No. 202011389718.6 filed with the China Patent Office on Dec. 2, 2020 and entitled "Sound Generating Assembly and an Electronic Device Having the Same", which are all hereby incorporated herein in their entirety by reference.

TECHNICAL FIELD

This application pertains to the technical field of electronic products, in particular to a sound generating assembly and an electronic device having the same.

BACKGROUND

Electronic products such as charging device usually have electrical connection parts such as metal elastic pieces for electrically connecting with the device to be charged to realize charging and other functions.

In the prior art, in order to inform the operator whether the charging device and the device to be charged are electrically connected in place, the charging device is often provided with a light emitting component. When the charging device and the device to be charged are electrically connected in place, the light emitting component will flash. If the light emitting component does not flash, it indicates that the charging device and the device to be charged has not been electrically connected in place, and the operator needs to continue to adjust the position of the device to be charged until the light emitting part flashes.

It can be seen that when the feedback of whether the device to be charged is in the charging status is acquired by using the flashing lights of a light emitting component, the feedback to the operator is often not obvious, especially for the device to be charged with a large size. When connected to the charging device, the device to be charged sometimes blocks the light emitting component, such that the operator cannot conveniently know the electrical connection status of the charging device and the device to be charged, it is difficult to provide reliable feedback to the operator, and thus the operation experience is poor.

In conclusion, how to ensure that the operator can conveniently and reliably know the electrical connection status between the charging device and the device to be charged is a technical problem that needs to be solved by those skilled in the art. In addition, other objects, desirable features and characteristics will become apparent from the subsequent summary and detailed description, and the appended claims, taken in conjunction with the accompanying drawings and this background.

SUMMARY

The object of the present disclosure is to provide a sound generating assembly and an electronic device having the same, which can enable the operator to clearly know the electrical connection status of the charging device and the device to be charged, and thus improve the operation experience.

In order to achieve the above object, the present disclosure provides a sound generating assembly, wherein the sound generating assembly comprises a bracket, two sides of the bracket are respectively connected with a housing and a cover having a through slot, and the cover is configured to move in a direction facing the housing or a direction away from the housing; a contact is provided between the bracket and the housing and is configured to move synchronously with the cover, an end of the contact that is away from the cover is provided with a sounding elastic piece, when the cover moves in the direction facing the housing and an upper surface of the bracket is exposed from the through slot, the sounding elastic piece is deformed and making a sound after being pressed by the contact.

Optionally, a mounting part is further provided between the bracket and the housing and is configured to move synchronously with the cover, and the contact is provided at an end of the mounting part that is away from the cover.

Optionally, an end of the mounting part that is facing the contact is provided with a stop surface, the contact comprises an elastic body and an end point that is provided on the elastic body and is configured to press the sounding elastic piece, and the elastic body protrudes from the stop surface in a direction facing the sounding elastic piece and can be attached to the stop surface.

Optionally, an end of the mounting part that is facing the contact is further provided with a mounting groove, and the elastic body is provided with a connecting part inserted into the mounting groove.

Optionally, the cover is provided with a pressing boss, the bracket is provided with a through hole through which the pressing boss passes, and the pressing boss abuts against the mounting part after passing through the through hole.

Optionally, a connecting plate is further provided between the bracket and the housing, the electrical connection part and the mounting part are respectively located on both sides of the connecting plate, and the bracket, the connecting plate and the housing are connected; the connecting plate is provided with a coaxial hole coaxial with the through hole, so that the pressing boss abuts against the mounting part after passing through the through hole and the coaxial hole.

Optionally, an elastic part is provided between the mounting part and the housing; when a pressure on the cover is released, the elastic part pushes the mounting part to move in a direction away from the housing, so that the cover covers the upper surface of the bracket.

The present disclosure also provides an electronic device comprising a sound generating assembly described in any one of the above items.

Optionally, the electronic device further comprises a cavity for accommodating the sound generating assembly, the cavity is provided with an adapter opening from which the cover and the electrical connection part protrude, and the electrical connection part is connected with a circuit board.

Optionally, the electronic device is specifically a charging device.

Compared with the above prior art, in the sound generating assembly according to the embodiments of the present disclosure, two sides of the bracket are respectively connected with the housing and the cover, the cover has a through slot, and the cover can move in a direction facing the housing or a direction away from the housing; when the cover moves a certain distance in the direction facing the housing, the electrical connection part can be exposed from the through slot of the cover. The contact is provided between the bracket and the housing, and is configured to move synchronously with the cover; the end of the contact that is away from the cover is provided with the sounding elastic piece; when the cover moves in the direction facing the housing, the contact and the cover move synchronously in the direction facing the housing until the contact and the sounding elastic piece abut against each other and press the sounding elastic piece to make the sounding elastic piece deform and make a sound; at the same time, the upper surface of the bracket is exposed from the through slot to realize corresponding functions.

The sound generating assembly arranged in such a way mainly has the following beneficial effects.

First, by means of the synchronous movement process of the contact and the cover, the contact presses the sounding elastic piece to make the sounding elastic piece deform and make a sound. In other words, the sound generated by pressing the sounding elastic piece enables the operator to clearly know that the upper surface of the current support is currently exposed from the through slot of the cover. In the case that the bracket is provided with an electrical connection part, it can indicate that the electrical connection part and the device to be connected are currently connected in place. Compared with the method of flashing lights of the light emitting component in the prior art, the sound prompt is more obvious and has a wider range of application, and there is no need to consider the problem in the prior art whether the device to be connected blocks the light emitting parts.

Second, as stated above, the sound is generated by pressing the sounding elastic piece, so a certain impact force will inevitably be generated, which will be also felt by the operator. The cooperation of the impact force and the sound further ensure that the operator can know that the upper surface of the support has been exposed from the through slot. In other words, in the case that the bracket is provided with an electrical connection part, it enables the operator to know that the connection between the device to be connected and the electrical connection part has been in place, so that the operator has a better operation experience.

Finally, as stated above, the sounding elastic piece only deforms during the movement of the cover. When the connection between the device to be connected and the electrical connection part is in place, or when the cover has not been pressed, the sounding elastic piece is in a relaxed state. Only in the process of pressing the cover, that is, in the process of connecting the device to be connected and the electrical connection part, the sound generating elastic piece will deform within a period of time, thereby reducing the deformation frequency of the sound generating elastic piece, improving the service life of the sound generating elastic piece, and further indirectly improving the service life of the sound generating assembly and ensuring reliable use.

The embodiment of the present disclosure also provides an electronic device having a sound generating assembly. The beneficial effects may refer to the above and will not be repeated here.

BRIEF DESCRIPTION OF DRAWINGS

The present invention will hereinafter be described in conjunction with the following drawing figures, wherein like numerals denote like elements, and.

Figure 1:
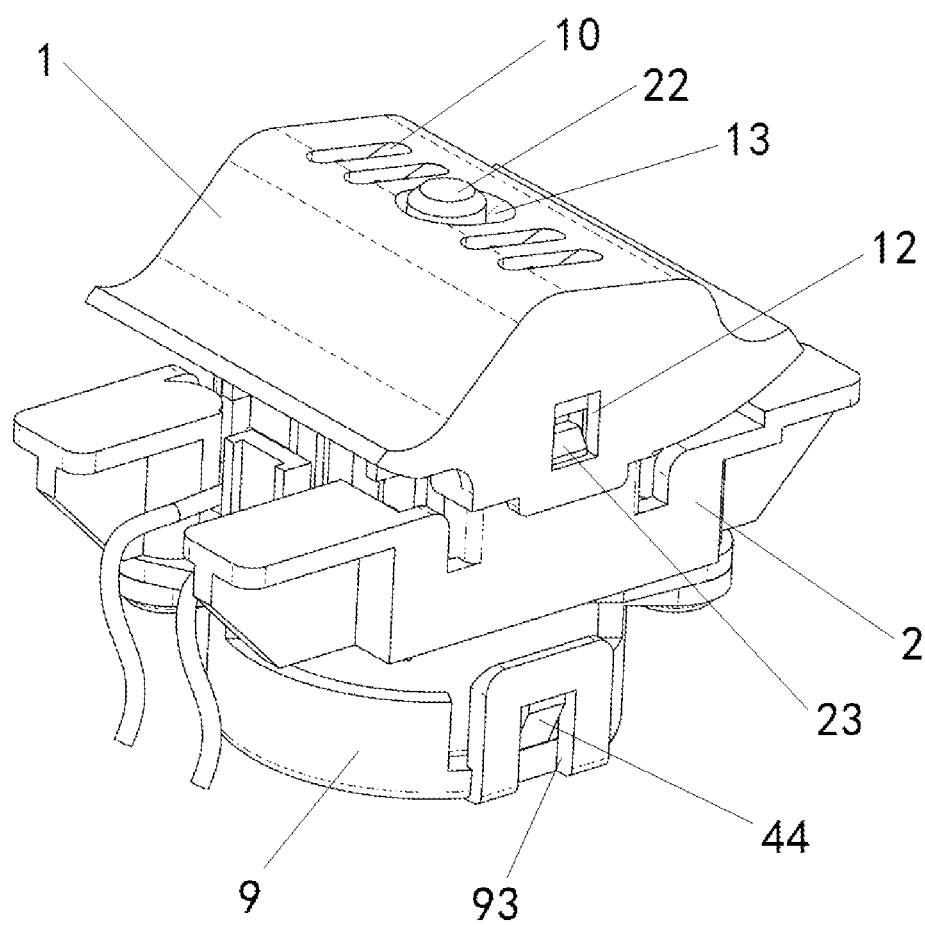
FIG. 1 is a schematic view of the structure of a sound generating assembly according to an embodiment of the present disclosure.

In the drawings:
1: cover, 10: through slot, 11: pressing boss, 12: first snap slot, 13: via hole; 2: bracket; 21: through hole; 22: guide column; 23: first snap; 3: electrical connection part; 4: connecting plate; 41: coaxial hole; 42: lug; 43: column; 44: second snap; 5: mounting part; 51: stop surface; 52: mounting groove; 6: contact; 60: elastic body; 61: end point; 62: connecting part; 7: sounding elastic piece; 8: elastic part; 9: housing; 90: position-limiting column; 91: mounting boss; 92: support column; 93: second snap slot; 94: fastening part; 100: device to be charged; 101: guide hole; 102: electrical connection base; 01: adapter opening; 02: casing; 03: sound generating assembly; 04: circuit board; 05: charging cable; 06: base plate.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

In order to enable those skilled in the art to better understand the solutions of the present disclosure, the present disclosure is further described in detail below in combination with the accompanying drawings and specific embodiments.

Referring to FIGS. 1 to 9, the sound generating assembly 03 according to an embodiment of the present disclosure comprises: a cover 1, a bracket 2, an electrical connection part 3, a contact 6 and a housing 9. The electrical connection part 3 is installed on the bracket 2, and the two may be fixedly installed.

Taking the orientation shown in FIG. 1 as an example, the cover 1 is installed on an upper surface of the bracket 2, the housing 9 is installed on a lower surface of the bracket 2, and the housing 9 and the bracket 2 are fixedly connected. The cover 1 is provided with a through slot 10, and the cover 1 can move downward relative to the bracket 2 to expose the electrical connection part 3 from the through slot 10, so that the electrical connection part 3 can be connected with a product to be connected, such as the device to be charged 100 above the cover 1.

With respect to the connection mode of the cover 1 and the bracket 2, the cover 1 may be provided with a first snap groove 12, and the bracket 2 is provided with a first snap 23. When the cover 1 slides relative to the bracket 2, the first snap 23 can slide within the range of the first snap groove 12. Moreover, the top of the first snap 23 and the bottom of the first snap groove 12 have a position-limiting effect, so as to prevent the cover 1 and the bracket 2 from being disconnected.

It can be appreciated that, when the cover 1 is not pressed by a product to be connected such as the device to be charged 100, the cover 1 is located above the electrical connection part 3 and can protect the electrical connection part 3 to a certain extent; when the product to be connected is placed on the cover 1 and moves downward, the cover 1 and the product to be connected move synchronously, and the electrical connection part 3 exposed from the through slot 10 can be connected with the product to be connected. The electrical connection part 3 may specifically be a metal elastic piece or the like.

Herein, the electrical connection part 3 may be located on the upper surface of the bracket 2, and when the electrical connection part 3 is connected with the product to be connected, only the electrical connection part 3 may be exposed. Namely, the electrical connection part 3 and the bracket 2 can be regarded as a whole, and the upper surface of the bracket 2 is exposed from the through slot 10 can be understood as the electrical connection part 3 is exposed from the through slot 10. In addition, for other types of sound generating assemblies 03, the upper surface of the bracket 2 may be provided with other components besides the electrical connection part 3, and when the upper surface of the bracket 2 is exposed from the through slot 10, the corresponding function can be realized.

In addition, the cover 1 may be further provided with a via hole 13, and the bracket 2 is provided with a guide column 22 which can extend out of the via hole 13. When the electrical connection part 3 is exposed from the through slot 10, the guide column 22 is exposed from the via hole 13. Through the guide column 22, it can be inserted into the specific position of the product to be connected, so as to ensure that the position between the product to be connected and the bracket 2 is fixed.

The contact 6 is located on the lower surface of the bracket 2, and can move synchronously with the cover 1. Since the bracket 2 is sandwiched between the contact 6 and the cover 1, it may be provided with a through hole 21 across its thickness, and the pressing boss 11 at the bottom of the cover 1 is connected with the contact 6 after passing through the through hole 21. Of course, as mentioned later, a mounting part 5 may be provided below the bracket 2, and a force is applied to the mounting part 5 by the pressing boss 11 so that the mounting part 5 applies the force to the contact 6. In addition, the contact 6 and the cover 1 may also be provided with other structures to realize synchronous movement, which is not limited to the method of opening a through hole 21 on the bracket 2. For example, the contact 6 and the cover 1 may be provided with a magnetic attraction member respectively, and two magnetic attraction members can generate a repulsive force with the bracket 2 sandwiched therebetween. When the cover 1 moves downward, the contact 6 will move downward synchronously under the action of the repulsive force.

A sounding elastic piece 7 is provided below the contact 6, and can be fixed to the housing 9. When the contact 6 moves downward under the action of the cover 1, the contact 6 gradually approaches the sounding elastic piece 7 until it contacts the sounding elastic piece 7. When the cover 1 continues to move downward, the contact 6 will make the sounding elastic piece 7 deform, that is, the sounding elastic piece 7 will deform after being pressed. Once the deformation of the sounding elastic piece 7 reaches a certain degree, the sounding elastic piece 7 will make a sound. At this point, the electrical connection part 3 is exposed from the through slot 10 of the cover 1, and can be connected with the product to be connected, as shown in FIGS. 5 to 9.

When it needs to disconnect the product to be connected from the electrical connection part 3, the product to be connected is directly removed, and the cover 1 and the contact 6 can move up synchronously. Finally, the cover 1 covers the electrical connection part 3, and the contact 6 is located above the sounding elastic piece 7, and the sounding elastic piece 7 rebound to its original shape and waits for the occurrence of the next elastic deformation.

It can be seen from the above that the sounding elastic piece 7 is deformed by the downward pressing force from the contact 6. The deformation of the sounding elastic piece 7 is specifically that the part in contact with the contact 6 is convex downward. Once the deformation of the sounding elastic piece 7 reaches a certain degree, the sounding elastic piece 7 will make a sound. When the contact 6 moves upward and separates from the sounding elastic piece 7, the sounding elastic piece 7 that is not pressed by the contact 6 will rebound to its original shape. The sounding elastic piece 7 may be horizontal. In order to ensure the reliable installation of the contact 6, a mounting part 5 may be provided between the bracket 2 and the housing 9. By making the mounting part 5 and the cover 1 move synchronously, the contact 6 and the mounting part 5 can be fixedly connected, thereby ensuring the synchronous movement of the contact 6 and the cover 1.

With respect to the synchronous movement mode between the mounting part 5 and the cover 1, it may refer to the magnetic attraction members mentioned above, and the synchronous movement of the mounting part 5 and the cover 1 can be realized through the repulsion force. Of course, the bracket 2 may also be provided with a through hole 21, and the bottom of the cover 1 is provided with a pressing boss 11. After passing through the through hole 21, the pressing boss 11 abuts against the mounting part 5 and further pushes the mounting part 5 downward. The advantage of this setting lies in that the cover 1, mounting part 5 and contact 6 are connected in sequence, the movement of the cover 1 is directly transferred to the mounting part 5, and acts on the contact 6 via the mounting part 5, thereby making the movement of the contact 6 reliable, and ensuring the normal operation of the sound generating assembly.

Figure 2:
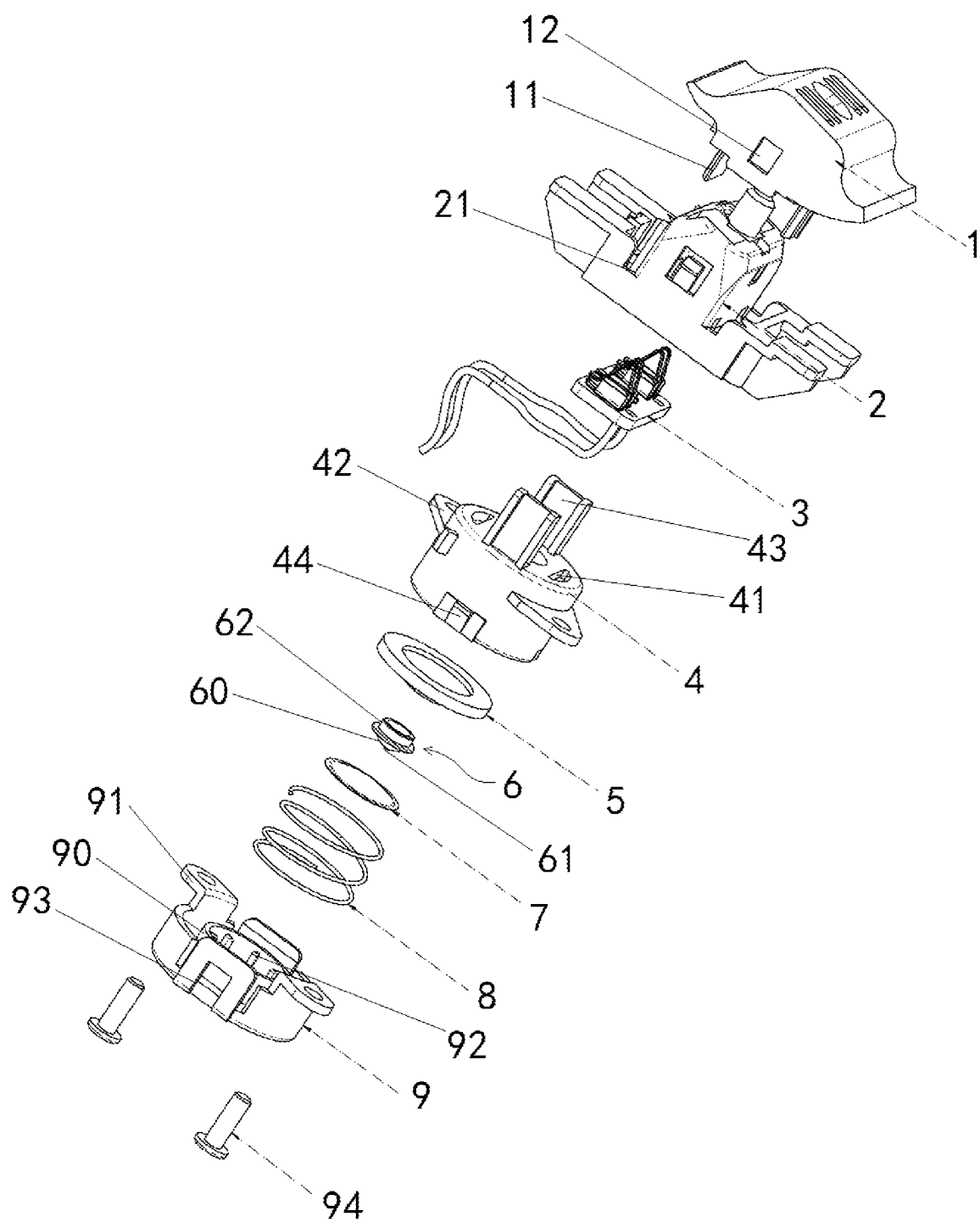
FIG. 2 is an exploded view of a sound generating assembly according to an embodiment of the present disclosure.
Figure 3:
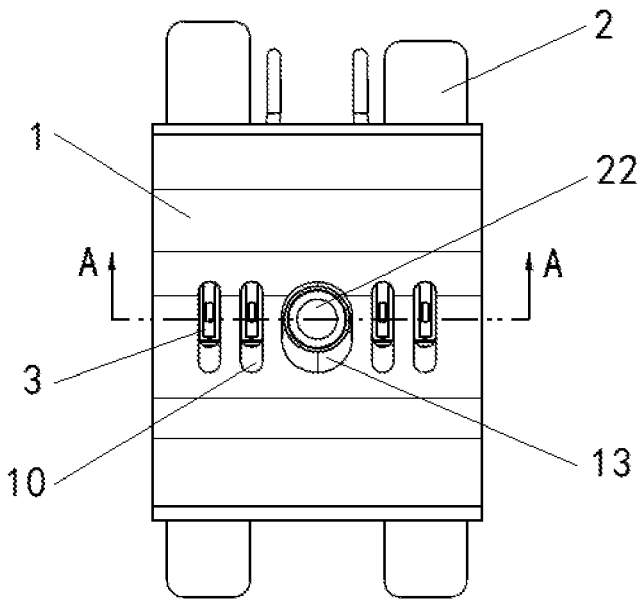
FIG. 3 is a top view of a sound generating assembly according to an embodiment of the present disclosure.
Figure 4:
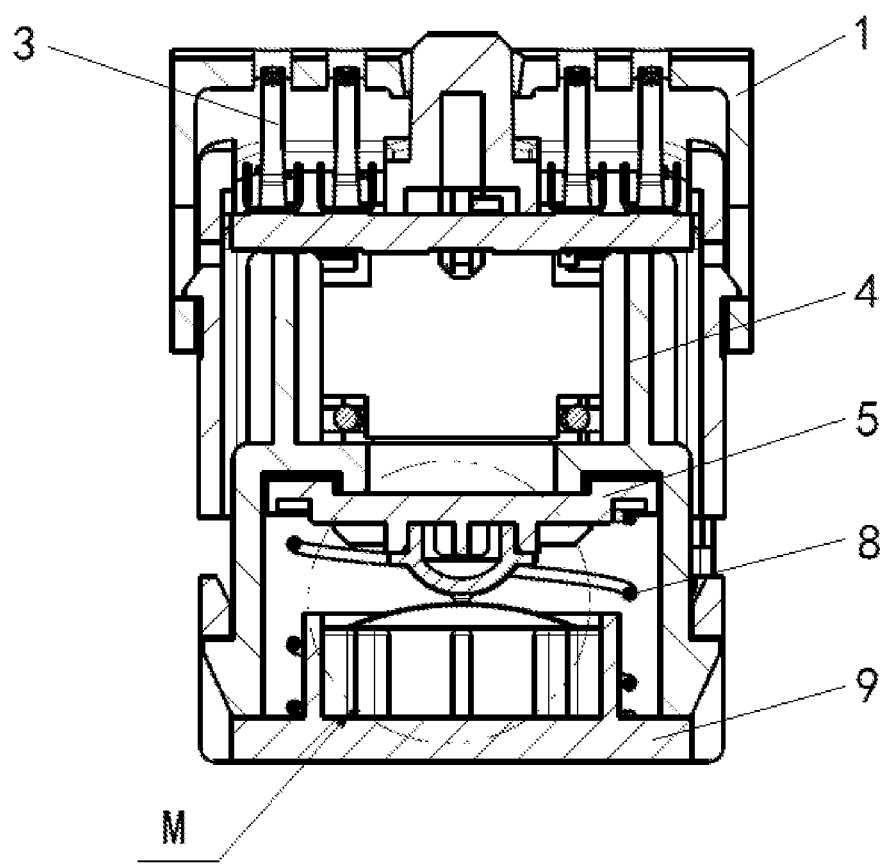
FIG. 4 is a sectional view along A-A line in FIG. 3.
Figure 5:
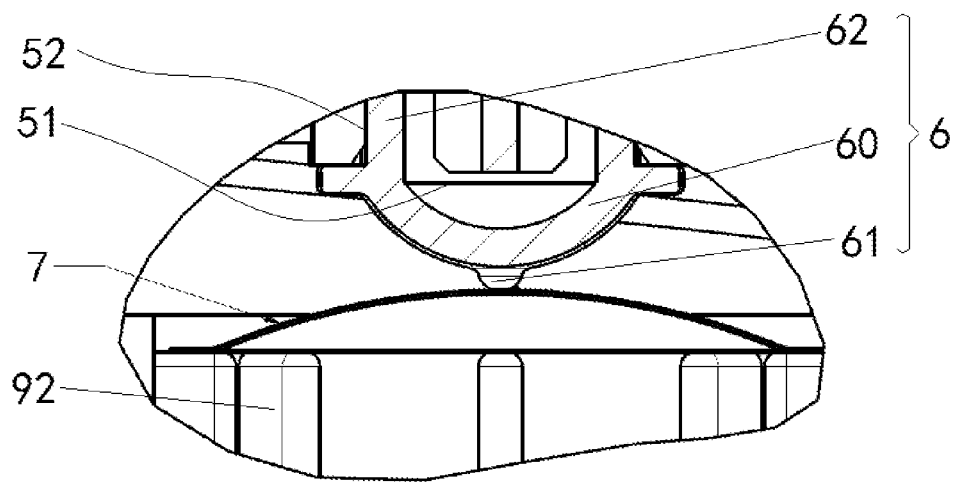
FIG. 5 is a schematic view of a part M in FIG. 4 when a sounding elastic piece has not been deformed during the process of pressing a cover.
Figure 6:
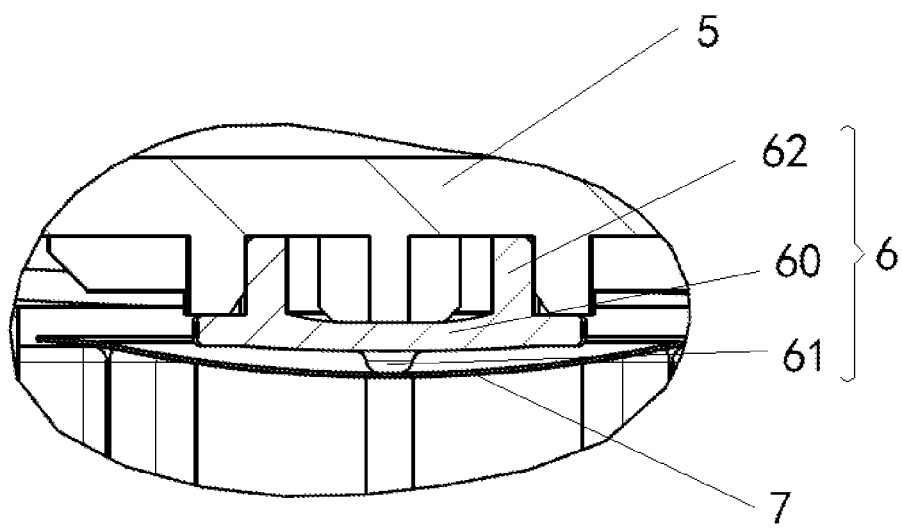
FIG. 6 is a schematic view of the part M in FIG. 4 when the sounding elastic piece has been deformed during the process of pressing the cover.

Referring to FIG. 2, a connecting plate 4 may be further provided between the bracket 2 and the mounting part 5. The connecting plate 4 is provided with a column 43, which is used to press against the lower surface of the electrical connection part 3, so as to ensure the reliable installation of the electrical connection part 3 and the bracket 2.

The connecting plate 4 may be provided with a coaxial hole 41, which is coaxial with the through hole 21. The pressing boss 11 of the cover 1 passes through the through hole 21 of the bracket 2 and the coaxial hole 41 of the connecting plate 4 in sequence from top to bottom, and finally contacts the upper surface of the mounting part 5.

The bracket 2, the connecting plate 4 and the housing 9 may be fixed. The connecting plate 4 may be provided with a lug 42. The housing 9 may be provided with a mounting boss 91. The lug 42 and the mounting boss 91 attach and fit each other. The lug 42, the mounting boss 91 and the bracket 2 may be provided with coaxial mounting holes. A fastening part 94 cooperates with three mounting holes to fix the bracket 2, the connecting plate 4 and the housing 9.

In order to further ensure the reliable connection between the connecting plate 4 and the housing 9, the connecting plate 4 may be provided with a second snap 44, and the housing 9 is provided with a second snap slot 93. The snap fit between the second snap 44 and the second snap slot 93 is used to fix the connecting plate 4 and the housing 9, as shown in FIGS. 1 and 2.

Referring to FIGS. 5, 6, 8 and 9, the lower surface of the mounting part 5 is provided with a stop surface 51. The contact 6 comprises an elastic body 60 and an end point 61, and may be integrally formed. The elastic body 60 protrudes from the stop surface 51 in the direction facing the sounding elastic piece 7, and the contact 6 is provided on the elastic body 60.

Specifically, the contact 6 may be a rigid contact or an elastic contact. For the rigid contact, it can move down synchronously with the mounting part 5, and then press the sounding elastic piece 7 to cause the sounding elastic piece 7 to make a sound.

For the elastic contact, the process of its pressing the sounding elastic piece 7 is as follows.

When the mounting part 5 and the cover 1 move down synchronously, the contact 6 moves down and contacts the sounding elastic piece 7. When the mounting part 5 and the contact 6 continue to move down, since the strength of the sounding elastic piece 7 is greater than that of the elastic body 60, the elastic body 60 is deformed, and becomes flaky under the pressure of the sounding elastic piece 7 and the mounting part 5. At this point, the elastic body 60 attaches to the stop surface 51 of the mounting part 5. When the mounting part 5 and the contact 6 continue to move down, the elastic body 60 cannot further deform anymore, so the contact 6 presses the sounding elastic piece 7 downward until the sounding elastic piece 7 deforms and makes a sound. At this point, the electrical connection part 3 is exposed from the through slot 10 of the cover 1, and the product to be connected is connected with the electrical connection part 3.

When it needs to remove the product to be connected from the cover 1, contrary to the above process, the sounding elastic piece 7 first recovers its original shape, and as the mounting part 5 and the cover 1 move upward synchronously, the elastic body 60 gradually recovers to a convex shape and waits for the next operation.

The advantage of using an elastic contact for the contact 6 lies in that it can compensate for a certain assembly error. Since the contact 6 can undergo certain elastic deformation, if the gap between the mounting part 5 and the sounding elastic piece 7 is small, the contact 6 can be kept in a pressurized state. When the mounting part 5 does not move downward, the contact 6 will not press the sounding elastic piece 7 to deform. If the gap between the mounting part 5 and the sounding elastic piece 7 is large, the contact 6 can be kept in a relaxed state, and the process of its pressing the sounding elastic piece 7 to deform can be referred to the above. In addition, when the contact 6 presses the sounding elastic piece 7, the contact 6 can absorb a part of the force from the mounting part 5 to prevent the sounding elastic piece 7 from being subjected to a large force, so as to improve the service life of the sounding elastic piece 7.

With respect to the connection between the contact 6 and the mounting part 5, the lower surface of the mounting part 5 may be provided with a mounting groove 52. The mounting groove 52 may have a ring shape, and the stop surface 51 is located in the middle of the ring shape. The elastic body 60 is provided with a connecting part 62, which is inserted into the mounting groove 52. Obviously, the connecting part 62 may also have a ring shape.

In this way, the contact area between the connecting part 62 and the mounting groove 52 is large, which can effectively ensure the reliable connection between the contact 6 and the mounting part 5, and can always make the elastic body 60 be connected with the mounting part 5 when the elastic body 60 is deformed, thereby improving the service reliability of the sound generating assembly 03.

In order to ensure that when the product to be connected is removed from the cover 1, the cover 1 can move upward by itself, an elastic part 8 such as a spring is provided between the mounting part 5 and the housing 9.

The top of the elastic part 8 abuts against the lower surface of the mounting part 5, and the bottom of the elastic part 8 abuts against the housing 9. When it needs to connect the product to be connected with the electrical connection part 3, it is necessary to overcome the elastic force of the elastic part 8 in order to move the cover 1 downward. When the product to be connected is removed from the cover 1, the elastic potential energy of the elastic part 8 is released, and the elastic part 8 pushes the mounting part 5 upward, so that the mounting part 5 pushes the cover 1 upward, and the cover 1 covers the outside of the electrical connection part 3.

Figure 7:
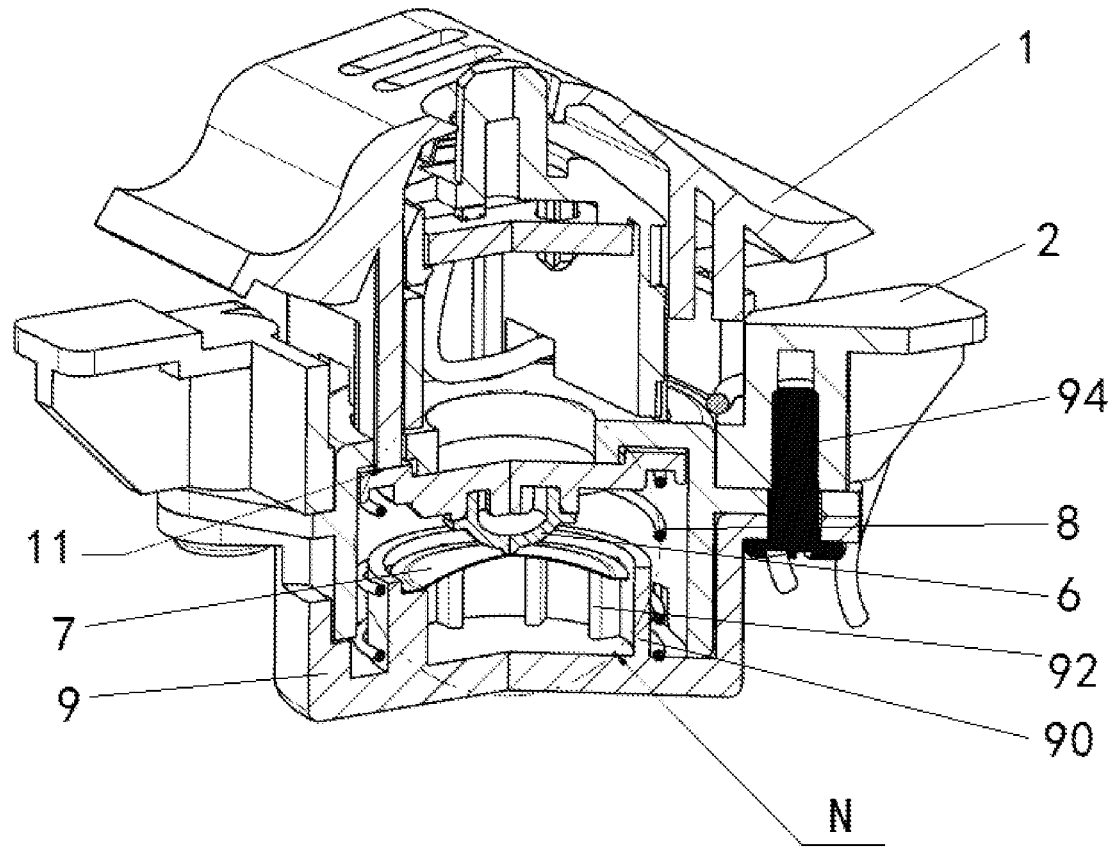
FIG. 7 is a schematic view of the internal structure of a sound generating assembly according to an embodiment of the present disclosure.
Figure 8:
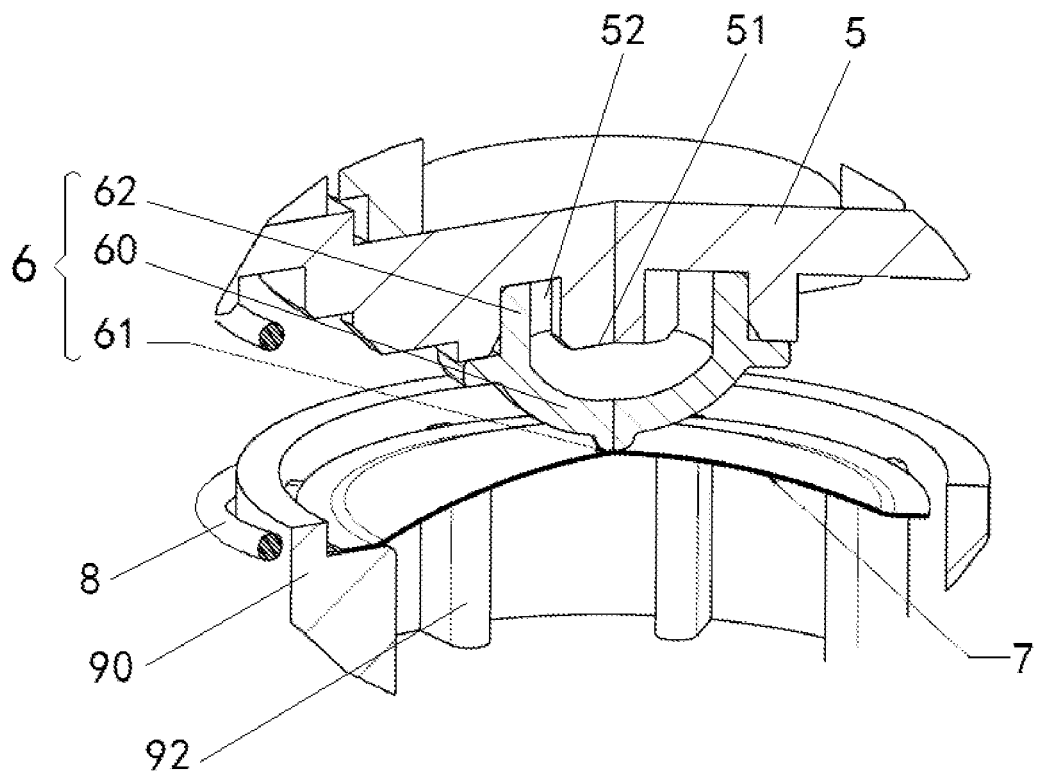
FIG. 8 is a schematic view of a part N in FIG. 7 when the sounding elastic piece has not been deformed during the process of pressing the cover.
Figure 9:
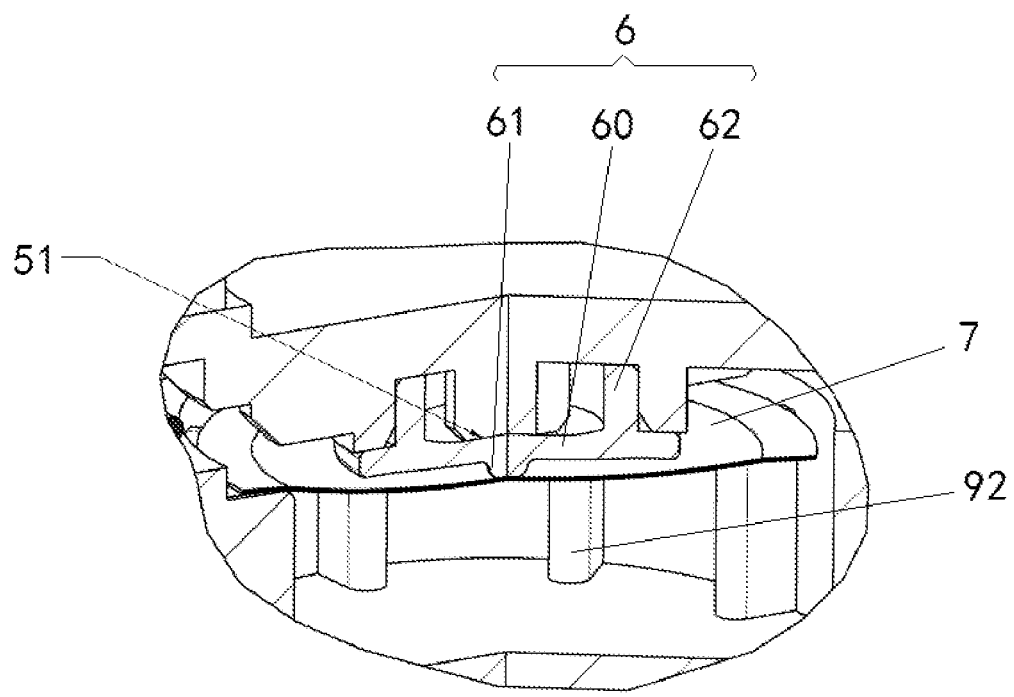
FIG. 9 is a schematic view of a part N in FIG. 7 when the sounding elastic piece has been deformed during the process of pressing the cover.

In order to realize the reliable fixation of the elastic part 8 and the housing 9, the housing 9 may be provided with a position-limiting column 90. The position-limiting column 90 is vertically provided, and the elastic parts 8 such as a spring may be sleeved on the outer circumference of the position-limiting column 90 to limit the position of the elastic part 8, as shown in FIG. 7 and FIG. 8.

The inner side of the position-limiting column 90 may also be provided with a plurality of support columns 92, which may be evenly distributed. The height of the support column 92 is lower than the height of the position-limiting column 90, and the position-limiting column 90 and the support column 92 form a boss structure. The edge of the sounding elastic piece 7 fits with the upper surface of the support column 92, and under the blocking effect of the position-limiting column 90, the sounding elastic piece 7 is prevented from greatly shifting from the support column 92.

An embodiment of the present disclosure also provides an electronic device comprising the sound generating assembly 03 described in the above specific embodiments. Other parts of the electronic device may refer to the prior art.

Figure 11:
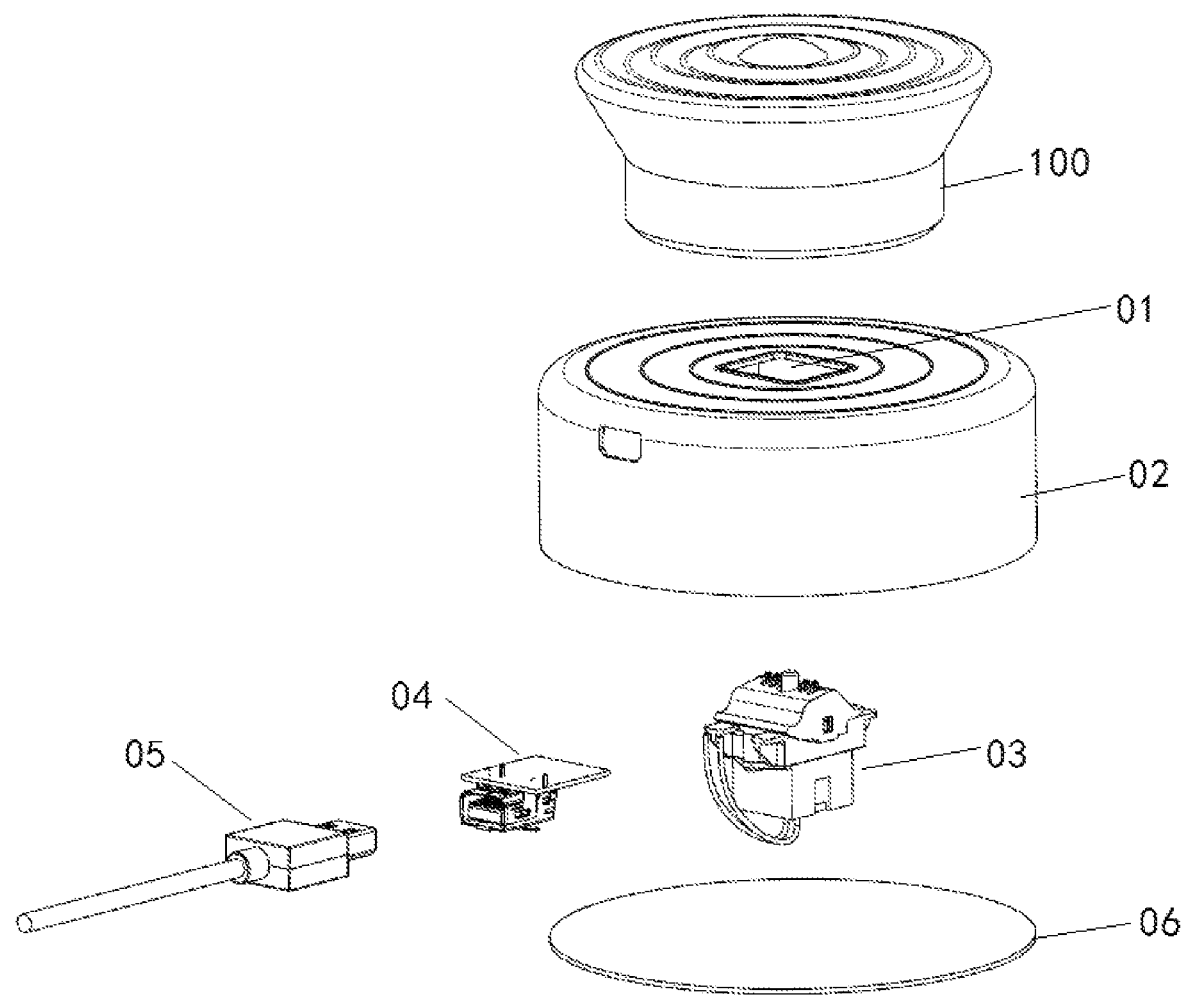
FIG. 11 is an exploded view of an electronic device having a sound generating assembly according to an embodiment of the present disclosure.

Referring to FIG. 11, the electronic device may comprise a cavity accommodating the sound generating assembly 03. The cavity is provided with an adapter opening 01. The cover 1 and the electrical connection part 3 of the sound generating assembly 03 can protrude from the adapter opening 01, and the electrical connection part 3 is connected with a circuit board 04.

The cavity may be formed after connecting a casing 02 and a base plate 06, and the adapter opening 01 may be provided on the casing 02. With respect to the case when the electronic device is specifically a charging device, the circuit board 04 may also be connected to a charging cable 05. During using, the device to be charged 100 is placed on the casing 02 so that an electrical connection base 102 of the device to be charged 100 presses the cover 1 to move the cover 1 downward to expose the electrical connection part 3. When the electrical connection base 102 and the electrical connection part 3 are connected, as described above, the sound generating assembly 03 makes a sound to prompt the operator that the charging device 100 and the charging device has been connected in place.

Figure 10:
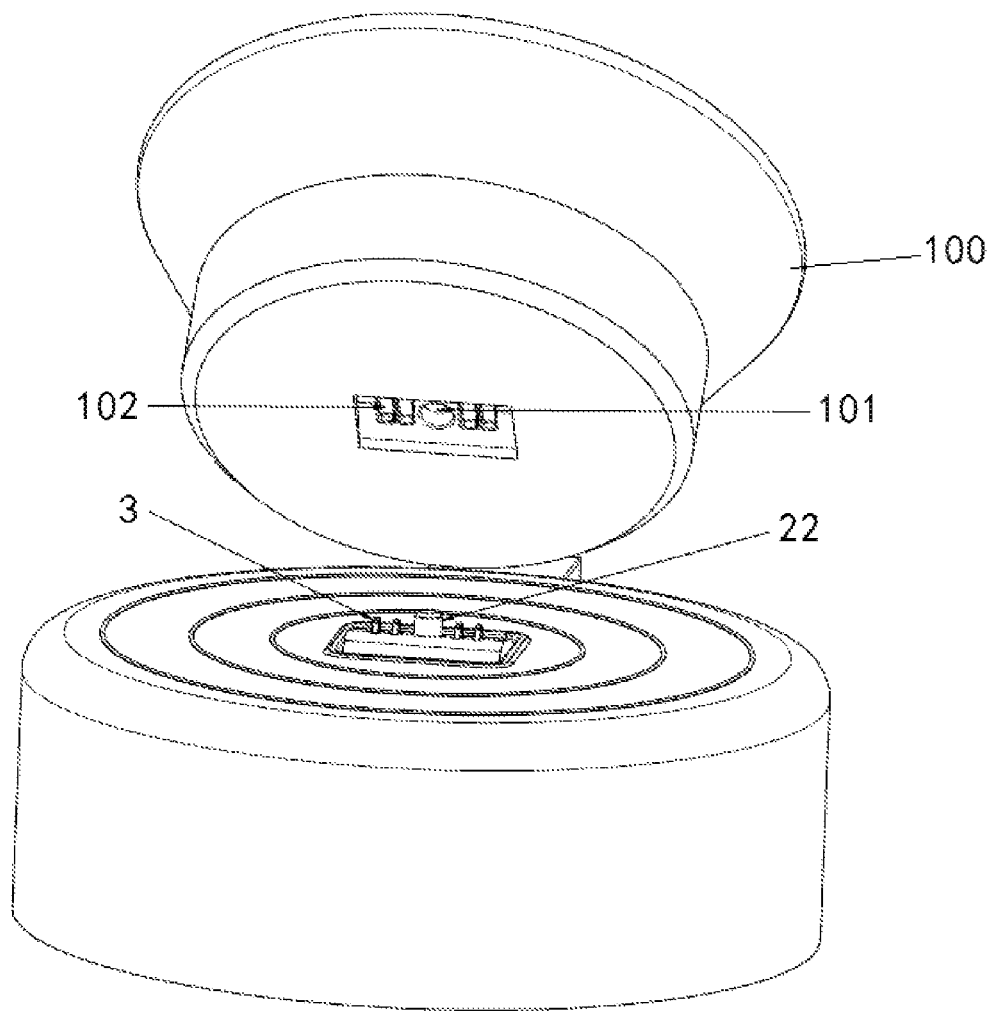
FIG. 10 is a schematic view of an electronic device having a sound generating assembly according to an embodiment of the present disclosure during use.

With respect to the case when the bracket 2 has a guide column 22, the device to be charged 100 may be further provided with a guide hole 101. The guide column 22 is located above the adapter opening 01, and the guide column 22 extends into the guide hole 101, so as to ensure that the position of the device to be charged 100 and the charging device is reliably fixed, as shown in FIG. 10.

It should also be noted that, relational terms such as first and second used herein are only to distinguish one entity or operation from another, and do not necessarily require or imply that there is such actual relationship or order among those entities or operations.

The above describes in detail the sound generating assembly and the electronic device having the same according to the present disclosure. Herein, specific examples are used to explain the principle and implementation modes of the present disclosure. The description of the above examples is only used to help understand the method and core idea of the present disclosure. It should be noted that, for those skilled in the art, various improvements and modifications can be made to the present disclosure without departing from the principle of the present disclosure, and these improvements and modifications shall also fall within the protection scope of the claims of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A sound generating assembly, wherein
the sound generating assembly comprises a bracket (2), two sides of the bracket (2) are respectively connected with a housing (9) and a cover (1) having a through slot (10), and the cover (1) is configured to move in a direction facing the housing (9) or a direction away from the housing (9),
a contact (6) is provided between the bracket (2) and the housing (9) and is configured to move synchronously with the cover (1), an end of the contact (6) that is away from the cover (1) is provided with a sounding elastic piece (7), when the cover (1) moves in a direction facing the housing (9) and an upper surface of the bracket (2) is exposed from the through slot (10), the sounding elastic piece (7) is deformed and making a sound after being pressed by the contact (6).

2. The sound generating assembly according to claim 1, wherein a mounting part (5) is further provided between the bracket (2) and the housing (9) and is configured to move synchronously with the cover (1), and the contact (6) is provided at an end of the mounting part (5) that is away from the cover (1).

3. The sound generating assembly according to claim 2, wherein an end of the mounting part (5) that is facing the contact (6) is provided with a stop surface (51), the contact (6) comprises an elastic body (60) and an end point (61) that is provided on the elastic body (60) and is configured to press the sounding elastic piece (7), and the elastic body (60) protrudes from the stop surface (51) in a direction facing the sounding elastic piece (7) and can be attached to the stop surface (51).

4. The sound generating assembly according to claim 3, wherein the end of the mounting part (5) that is facing the contact (6) is further provided with a mounting groove (52), and the elastic body (60) is provided with a connecting part (62) inserted into the mounting groove (52).

5. The sound generating assembly according to claim 2, wherein the cover (1) is provided with a pressing boss (11), the bracket (2) is provided with a through hole (21) through which the pressing boss (11) passes, and the pressing boss (11) abuts against the mounting part (5) after passing through the through hole (21).

6. The sound generating assembly according to claim 5, wherein a connecting plate (4) is further provided between the bracket (2) and the housing (9), and the bracket (2), the connecting plate (4) and the housing (9) are connected;
the connecting plate (4) is provided with a coaxial hole (41) coaxial with the through hole (21), so that the pressing boss (11) abuts against the mounting part (5) after passing through the through hole (21) and the coaxial hole (41).

7. The sound generating assembly according to claim 5, wherein an elastic part (8) is provided between the mounting part (5) and the housing (9);
when a pressure on the cover (1) is released, the elastic part (8) pushes the mounting part (5) to move in a direction away from the housing (9), so that the cover (1) covers the upper surface of the bracket (2).

8. An electronic device comprising a sound generating assembly (03) according to claim 1.

9. The electronic device according to claim 8, wherein an upper surface of the bracket (2) is provided with an electrical connection part (3) which protrudes from the through slot (10);
the electronic device further comprises a cavity which accommodates the sound generating assembly (03), and the cavity is provided with an adapter opening (01) from which the cover (1) and the electrical connection part (3) protrude; and
the electrical connection part (3) is connected with a circuit board (04).

10. The electronic device according to claim 8, wherein the electronic device is specifically a charging device.

11. The sound generating assembly according to claim 3, wherein the cover (1) is provided with a pressing boss (11), the bracket (2) is provided with a through hole (21) through which the pressing boss (11) passes, and the pressing boss

(11) abuts against the mounting part (5) after passing through the through hole (21).

12. The sound generating assembly according to claim 4, wherein the cover (1) is provided with a pressing boss (11), the bracket (2) is provided with a through hole (21) through which the pressing boss (11) passes, and the pressing boss (11) abuts against the mounting part (5) after passing through the through hole (21).

13. The electronic device according to claim 8, wherein a mounting part (5) is further provided between the bracket (2) and the housing (9) and is configured to move synchronously with the cover (1), and the contact (6) is provided at an end of the mounting part (5) that is away from the cover (1).

14. The electronic device according to claim 8, wherein an end of a mounting part (5) that is facing the contact (6) is provided with a stop surface (51), the contact (6) comprises an elastic body (60) and an end point (61) that is provided on the elastic body (60) and is configured to press the sounding elastic piece (7), and the elastic body (60) protrudes from the stop surface (51) in a direction facing the sounding elastic piece (7) and can be attached to the stop surface (51).

15. The electronic device according to claim 8, wherein an end of a mounting part (5) that is facing the contact (6) is further provided with a mounting groove (52), and an elastic body (60) is provided with a connecting part (62) inserted into the mounting groove (52).

16. The electronic device according to claim 8, wherein the cover (1) is provided with a pressing boss (11), the bracket (2) is provided with a through hole (21) through which the pressing boss (11) passes, and the pressing boss (11) abuts against a mounting part (5) after passing through the through hole (21).

17. The electronic device according to claim 8, wherein a connecting plate (4) is further provided between the bracket (2) and the housing (9), and the bracket (2), the connecting plate (4) and the housing (9) are connected;

the connecting plate (4) is provided with a coaxial hole (41) coaxial with the through hole (21), so that a pressing boss (11) abuts against a mounting part (5) after passing through a through hole (21) and the coaxial hole (41).

18. The electronic device according to claim 8, wherein an elastic part (8) is provided between a mounting part (5) and the housing (9);

when a pressure on the cover (1) is released, the elastic part (8) pushes the mounting part (5) to move in a direction away from the housing (9), so that the cover (1) covers the upper surface of the bracket (2).

19. The electronic device according to claim 9, wherein the electronic device is specifically a charging device.

* * * * *